(12) United States Patent
Baronj et al.

(10) Patent No.: US 10,839,018 B2
(45) Date of Patent: Nov. 17, 2020

(54) EVALUATION OF PLURAL EXPRESSIONS CORRESPONDING TO INPUT DATA

(71) Applicant: International Business Machines Corporation, Armonk, NY (US)

(72) Inventors: Kush Baronj, Zirapur (IN); Praveen Devarao, Karnataka (IN); Trent Gray-Donald, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 15/813,308

(22) Filed: Nov. 15, 2017

(65) Prior Publication Data

US 2019/0147113 A1 May 16, 2019

(51) Int. Cl.
| | |
|---|---|
| *G06F 7/00* | (2006.01) |
| *G06F 16/903* | (2019.01) |
| *G06F 17/27* | (2006.01) |
| *H04L 29/06* | (2006.01) |
| *G06F 9/448* | (2018.01) |

(52) U.S. Cl.
CPC ...... *G06F 16/90344* (2019.01); *G06F 9/4494* (2018.02); *G06F 9/4498* (2018.02); *G06F 17/2775* (2013.01); *H04L 63/1416* (2013.01); *H04L 63/1425* (2013.01); *H04L 63/20* (2013.01)

(58) Field of Classification Search
CPC .............................................. G06F 16/90344
See application file for complete search history.

(56) References Cited

U.S. PATENT DOCUMENTS

| | | |
|---|---|---|
| 7,225,188 B1 | 5/2007 | Gai et al. |
| 7,340,475 B2 | 3/2008 | Chowdhary et al. |
| 8,756,170 B2 | 6/2014 | Chen et al. |
| 8,892,580 B2 | 11/2014 | Syrowitz et al. |
| 8,990,232 B2 | 3/2015 | Rossi |
| 9,244,903 B2 | 1/2016 | Huang et al. |
| 2010/0211379 A1 | 8/2010 | Gorman et al. |
| 2013/0246433 A1 | 9/2013 | Fuller et al. |

(Continued)

OTHER PUBLICATIONS

List of IBM Patents or Patent Applications Treated as Related, filed May 7, 2019.

(Continued)

*Primary Examiner* — Ajith Jacob
(74) *Attorney, Agent, or Firm* — Richard Wilhelm; Edell, Shapiro & Finnan, LLC (57) ABSTRACT

An embodiment of the present invention evaluates plural expressions. A model is generated and configured to evaluate a plurality of expressions each including one or more expression tokens and indicating a data pattern. The model includes a plurality of nodes with one or more of the nodes associated with an expression token and one or more links between the nodes. The links are associated with information indicating each expression including each expression token associated with nodes connected by the links. Data including one or more data tokens is applied to the model. The nodes of the model are traversed over one or more corresponding links based on the one or more data tokens within the data corresponding to expression tokens associated with the nodes. Expressions corresponding to the data are determined based on the expressions associated with the one or more corresponding links.

13 Claims, 4 Drawing Sheets

(56) References Cited

U.S. PATENT DOCUMENTS

| | | | |
|---|---|---|---|
| 2014/0282586 A1* | 9/2014 | Shear | G06F 9/5072 |
| | | | 718/104 |
| 2016/0028766 A1 | 1/2016 | Valgenti et al. | |
| 2016/0034305 A1* | 2/2016 | Shear | G06F 16/245 |
| | | | 707/722 |
| 2016/0275205 A1 | 9/2016 | Lehavi et al. | |
| 2016/0283574 A1 | 9/2016 | Anderson et al. | |
| 2017/0083616 A1 | 3/2017 | Atasu | |
| 2017/0277682 A1 | 9/2017 | Fink et al. | |

OTHER PUBLICATIONS

Cox, "Regular Expression Matching Can Be Simple and Fast (but is slow in Java, Perl, PHP, Python, Ruby, . . . )", Jan. 2007, 19 pages.

* cited by examiner

EVALUATION OF PLURAL EXPRESSIONS CORRESPONDING TO INPUT DATA

BACKGROUND

1. Technical Field

Present invention embodiments relate to expression evaluation, and more specifically, to identifying one or more expressions corresponding to input data based on a single pass over the input data.

2. Discussion of the Related Art

Categorizing or classifying data depends heavily on expressions to identify patterns in a given input. Multiple expressions are processed as the data being received (e.g., input from a database, input from data streams, etc.) may belong to different categories. For instance, a 12-digit number may be categorized as a bank account number, an Aadhar number, etc. However, the pattern of each category is different. Since multiple expressions are processed over a given input to identify all possible categories, it is challenging to have a constant response time due to a growing list of categories (and the expressions defining them).

Further, evaluating expressions for a match or non-match with respect to input data is a time consuming operation, especially when the expression is known to contain different wildcard characters ("*", "+", "?", etc.). There are several modules that are needed to run against a list of expressions to find a possible match from the list (single or plural matching expressions) for a given input. A module processing an expression list with a number of elements potentially ranging from tens to hundreds can become a bottleneck of an application stack. Accordingly, this task becomes challenging for applications needing faster responses, such as stream analytics applications that need to process and categorize the stream data within a few microseconds.

Different mechanisms have been implemented to pre-filter the list of expressions by processing metadata before executing the actual expressions for a given input, thereby improving the throughput of a module. However, these mechanisms do not provide significant improvement since a long list of expressions remains to be evaluated after the filtering.

SUMMARY

According to one embodiment of the present invention, a system evaluates plural expressions and includes a processor. The system generates a model configured to evaluate a plurality of expressions each including one or more expression tokens and indicating a data pattern. The model includes a plurality of nodes with one or more of the nodes associated with an expression token and one or more links between the nodes. The links are associated with information indicating each expression including each expression token associated with nodes connected by the links. Data including one or more data tokens is applied to the model. The nodes of the model are traversed over one or more corresponding links based on the one or more data tokens within the data corresponding to expression tokens associated with the nodes. Expressions corresponding to the data are determined based on the expressions associated with the one or more corresponding links. Embodiments of the present invention further include a method and computer program product for evaluating plural expressions in substantially the same manner described above.

BRIEF DESCRIPTION OF THE DRAWINGS

Generally, like reference numerals in the various figures are utilized to designate like components.

DETAILED DESCRIPTION

Present invention embodiments handle expressions in a manner that identifies plural expressions matching input data (e.g., a character string, etc.) from a list of expressions in a constant amount of time irrespective of the number of expressions in the list. For example, an expression list with a number of elements potentially ranging from tens to hundreds needs to pass over the input data at least once for each expression in the list. This can be extremely time consuming since processing time increases as the list of expressions grows which can lead to a bottleneck of an application stack. In addition, expression evaluation becomes extremely challenging for applications needing fast responses, such as stream analytics applications that need to process and categorize the stream data within a few microseconds.

Present invention embodiments perform one pass over input data and identify all matching expressions. This avoids traversing input data at least once for each expression of the list (in a loop) to determine the presence of matches which significantly reduces processing time and increases computing performance. Further, the response time remains constant for a given input regardless of the number of expressions to evaluate. Thus, the response time is based on the size of the input data which can provide significant computing and resource savings compared to having increasing response times as the quantity of expressions increases. This enables expression evaluation without bottlenecks and for applications needing fast response times (e.g., stream analytics and other applications that need to process data within a short time interval).

Present invention embodiments employ a model to evaluate plural expressions simultaneously and in a manner that computing or processing performance is dependent on a size of the input data. Accordingly, any number of expressions may be evaluated with one pass over the input data. Expressions are currently evaluated by building a Finite Automata for an expression with control moving from one state (e.g., node when represented graphically) to another when a respective operator (or character assigned to an edge) is identified in a given string. The model of present invention embodiments assigns the operators (e.g., characters, etc.) as nodes in the model with edges containing information of the possible matching expressions when traversed from one node to another.

Figure 1:
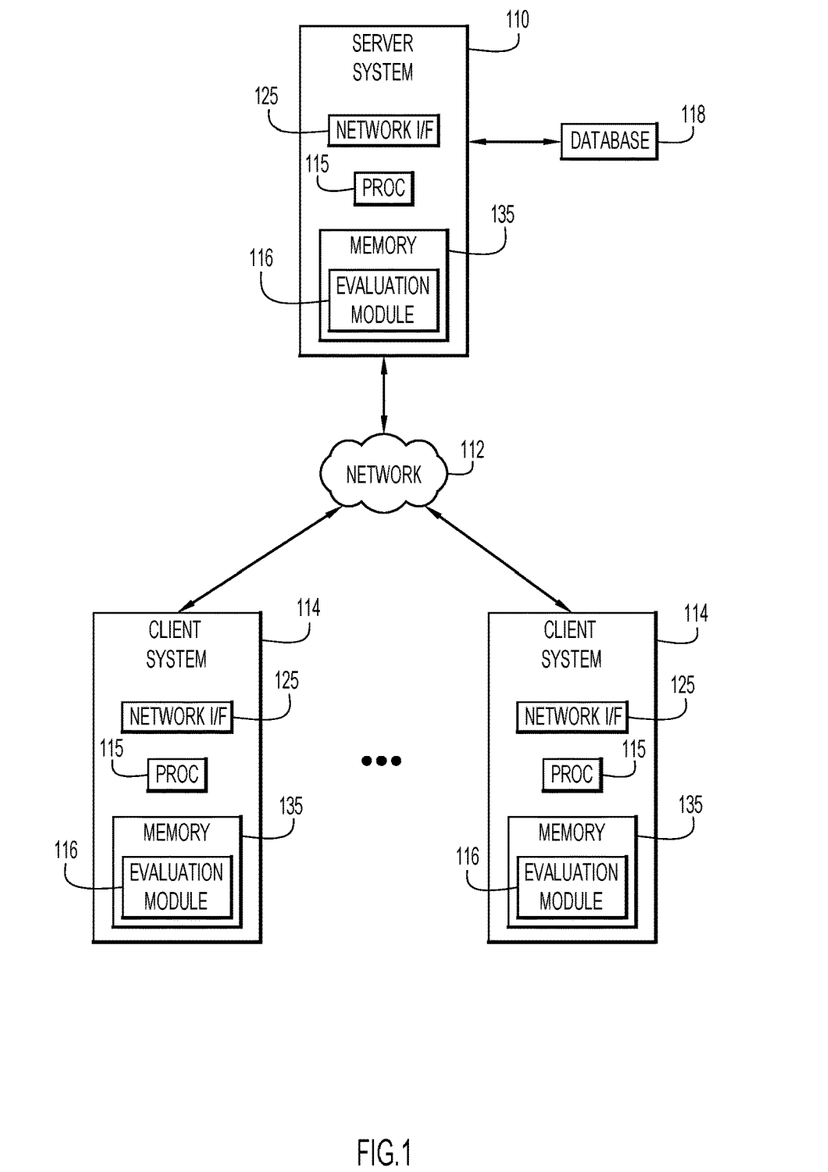
FIG. 1 is a diagrammatic illustration of an example computing environment of an embodiment of the present invention.

An example environment of an embodiment of the present invention is illustrated in FIG. 1. Specifically, the environment includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to submit requests (e.g., input or other data for analysis, etc.) to server systems 110 to determine expressions matching the input data. The server systems include an evaluation module 116 to evaluate expressions for input data as described below. A database system 118 may store various information for the analysis (e.g., expressions, expression identifiers, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to desired data for analysis, and may provide reports including analysis results (e.g., matching expressions or categories, etc.).

Server systems 110 and client systems 114 may be implemented by any conventional or other computer systems preferably equipped with a display or monitor, a base, optional input devices (e.g., a keyboard, mouse or other input device), and any commercially available and custom software (e.g., server/communications software, evaluation module, browser/interface software, etc.). The base preferably includes at least one hardware processor 115 (e.g., microprocessor, controller, central processing unit (CPU), etc.), one or more memories 135, and internal or external network interfaces or communications devices 125 (e.g., modem, network cards, etc.).

Alternatively, one or more client systems 114 may evaluate expressions for input data when operating as a stand-alone unit. In a stand-alone mode of operation, the client system stores or has access to the data and includes evaluation module 116 to evaluate expressions for input data as described below. The graphical user (e.g., GUI, etc.) or other interface (e.g., command line prompts, menu screens, etc.) solicits information from a corresponding user pertaining to the desired analysis, and may provide reports including analysis results.

Evaluation module 116 may include one or more modules or units to perform the various functions of present invention embodiments described below. The various modules (e.g., evaluation module, etc.) may be implemented by any combination of any quantity of software and/or hardware modules or units, and may reside within memory 135 of the server and/or client systems for execution by processor 115.

Figure 2:
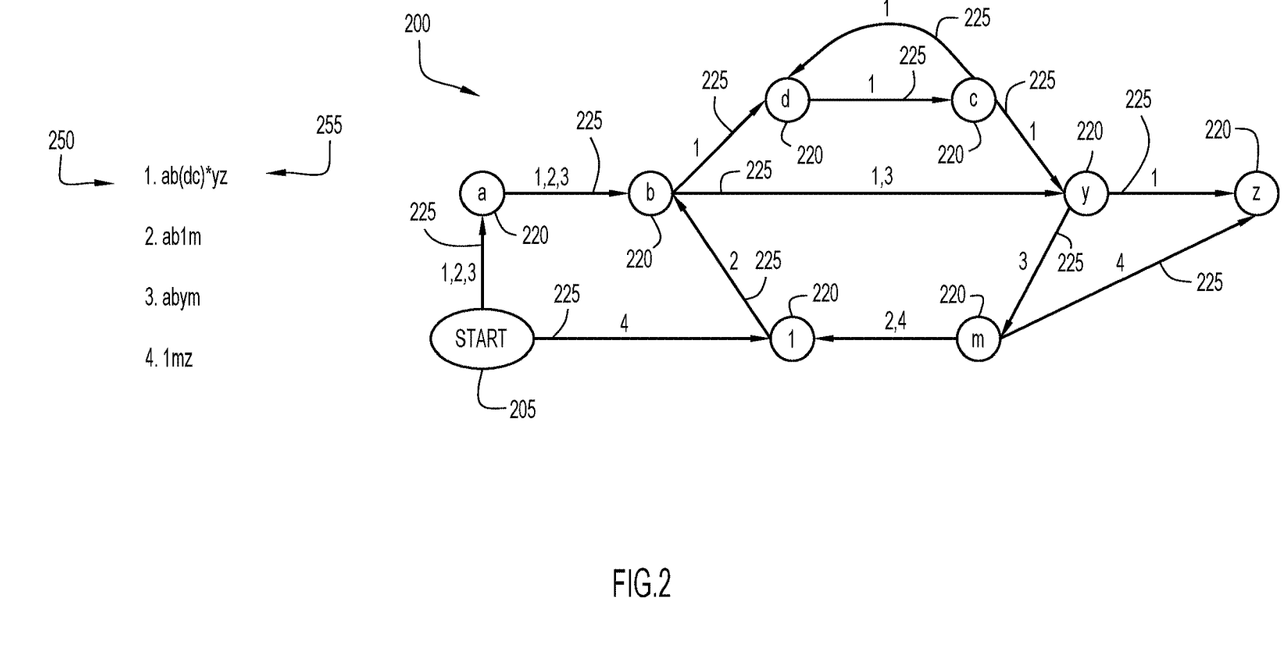
FIG. 2 is a diagrammatic illustration of an example model for expression evaluation according to an embodiment of the present invention.

An example model 200 for expression evaluation is illustrated in FIG. 2. The model is typically in the form of a graph, and is generated at compile time (e.g., via evaluation module 116 and a server system 110 and/or client system 114). Model 200 represents various expressions, each indicating a pattern to identify, validate, and/or categorize data (e.g., social security number, address, date, employee identification, etc.). The pattern may be represented by specifying exact tokens and a corresponding token arrangement for input data (e.g., a string to match an input string, etc.), or by specifying a structure or format for the input data (e.g., a quantity of a set of certain tokens to be included in the input string, etc.) For example, a 12-digit number may be categorized as a bank account number, an Aadhar number, etc., where various expressions may indicate patterns for these different types of numbers. Model 200 may be utilized to process data to identify one or more expressions 255 satisfied by or matching the data for categorization, validation, and/or other purposes (e.g., determine whether the data is a bank account number, Aadhar number, social security number, or other type of information, validate data, etc.). The expressions each include one or more expression tokens. An expression token preferably represents an individual item from an expression 255. For example, an expression token may include an alphanumeric character, punctuation, or symbol with respect to string data, a numeric digit with respect to numeric data, etc. However, an expression token may include any amount of data of any type. The expressions may include regular expressions, or any other types of expressions of any syntax or format for identifying any types of patterns within data.

Model 200 includes an initial or start node 205, one or more intermediate nodes 220 each corresponding to an expression token of an expression 255, and one or more edges or links 225 between pairs of nodes 220. A pointer references start node 205 before parsing of input data. The start node includes links to all possible expression tokens (or nodes 220) that may be associated with a first expression token of an expression 255. The model is subsequently traversed from start node 205 based on the input data as described below.

Model 200 is configured for expressions 255 from an expression list, where expression tokens of the expressions are associated with intermediate nodes 220. Expressions 255 are each associated with an expression identifier 250 that is used within model 200 to reference a corresponding expression. An expression identifier may include any quantity of any type of characters, numeric digits, and/or symbols (e.g., alphanumeric characters, numeric digits, symbols, punctuation, etc.) to identify an expression. Paths through model 200 comprise one or more nodes 220, and represent one or more expressions 255 from the expression list. A link 225 is disposed between two nodes 220 when an expression contains the two corresponding expression tokens consecutively. Link 225 contains information of each candidate or possible expression for the input data when the input data contains data tokens corresponding to expression tokens of a consecutive series of nodes. For example, a link 225 between nodes 220 associated with expression tokens "a" and "b" indicates that the group "ab" (within the input data being processed) may satisfy candidate expressions associated with expression identifiers 1, 2, and 3 (e.g., expressions "ab(dc)*yz", "ablm", and "abym" as viewed in FIG. 2 since each of these expressions starts with the group "ab")).

Links 225 may each further be associated with metadata for each expression associated with that link. For example, each link 225 may be associated with metadata parameters to handle cases of quantification of sets of expression tokens in expressions 255. The quantification typically identifies a set of one or more expression tokens and indicates a minimum and/or maximum quantity of occurrences for the set of expression tokens in the input data being processed. For example, an expression "(ab){4,5}" indicates that the set of expression tokens "ab" must occur a minimum of four times and a maximum of five times within the input data for the data to satisfy or match the expression.

Further, the metadata may include a wildcard parameter indicating whether an associated expression ends with a set of expression tokens that is quantified with a wildcard. By way of example, a wildcard may indicate: zero or more occurrences of the set of expression tokens within an expression (e.g., a wildcard of "*"); one or more occurrences of the set of expression tokens within the expression (e.g., a wildcard of "+"); and a single occurrence of the set of expression tokens within the expression (e.g., a wildcard of "?"). By way of example, expression "ab(dc)*yz" includes a wildcard (e.g., "*" as viewed in FIG. 2) for the set of expression tokens "dc". This indicates that the set of expression tokens "dc" may occur zero or more times in the input data to satisfy or match the expression. Plural occurrences of a set of expression tokens may be represented in model 200 by a loop (e.g., a link 225 returning back to a prior node). For example, a link 225 extends from a node 220 corresponding to an expression token "c" back to a node 220 corresponding to an expression token "d" (e.g., as viewed in FIG. 2) to enable the model to account for plural occurrences of the set of expression tokens "dc" (for the expression "ab(dc)*yz").

During compile time, plural expressions are accepted and model 200 is generated with all of the expressions represented on one unified graph. The model or graph is updated with information for appropriate nodes 220 and links 225 in response to expressions being added. By way of example, nodes 220 and links 225 of model 200 represent example expressions 255 (e.g., "ab(dc)*yz", "ablm", "abym", "lmz"). However, model 200 may be generated to represent any quantity of any types of expressions indicating any desired patterns or arrangements of expression tokens for categorization of input data or other purposes.

Figure 3A:
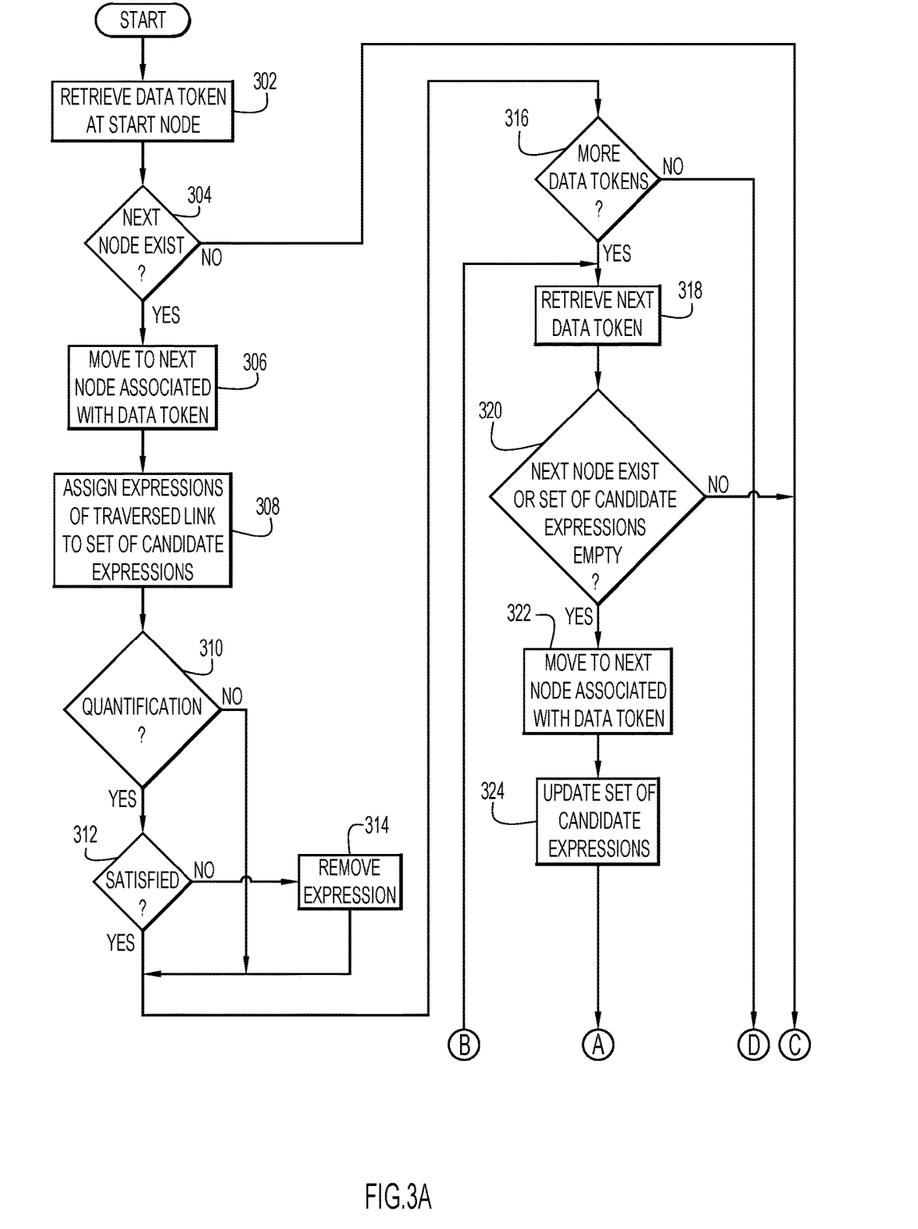
FIGS. 3A-3B are a procedural flowchart illustrating a manner of evaluating plural expressions for input data according to an embodiment of the present invention.
Figure 3B:
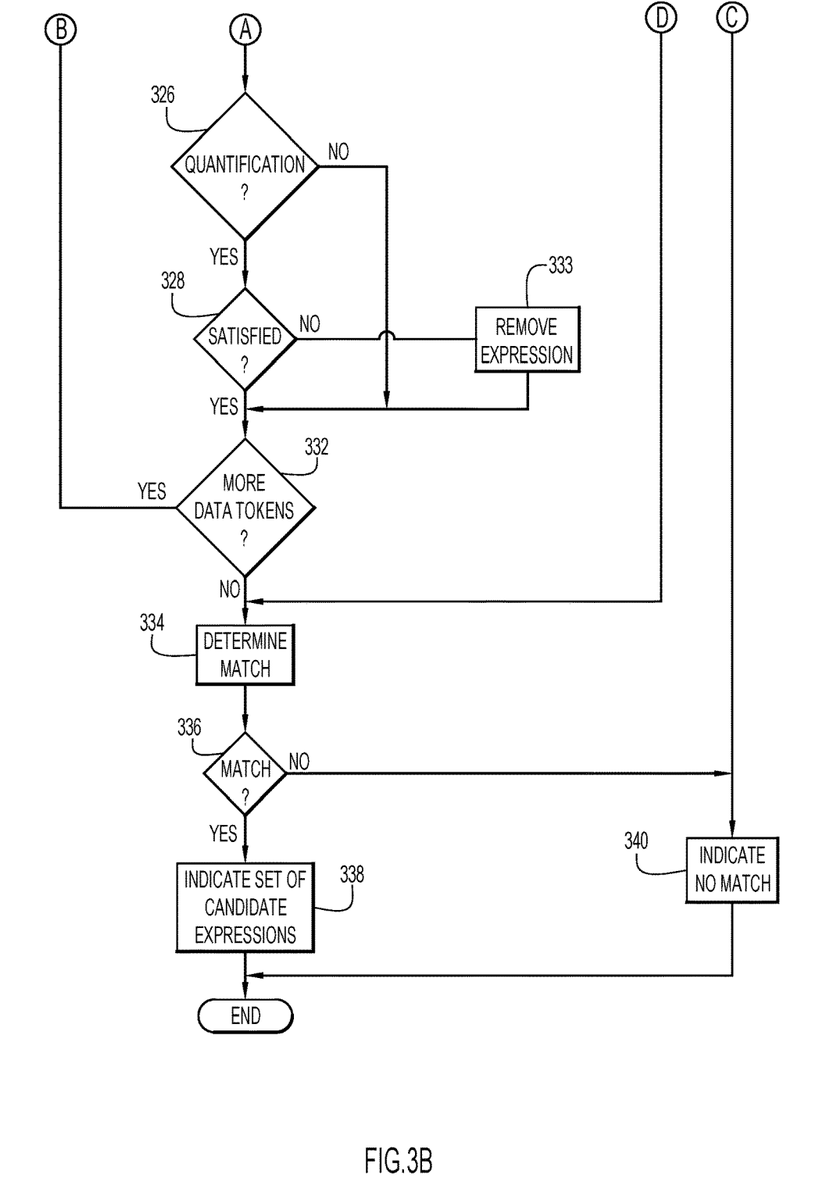

A manner of evaluating expressions using model 200 (e.g., via evaluation module 116 and a server system 110 and/or a client system 114) according to an embodiment of the present invention is illustrated in FIGS. 3A and 3B. Initially, a request is received with input data to identify expressions (or patterns) satisfied by or matched to the input data. The request may be entered by a user or received from various sources (e.g., an input from a database, an input from data streams, an input from an application, etc.). The input data may be of any type (e.g., string, numeric, etc.) and include one or more data tokens (e.g., a character, numeric digit, etc.). A model 200 is accessed and processing initiates from start node 205. This model is substantially similar to the model described above, but may be configured for any desired expressions.

A data token from the input data is retrieved at step 302 (FIG. 3A), and a corresponding node 220 of model 200 associated with an expression token matching or corresponding to the retrieved data token is determined. When no node corresponding to the retrieved data token exists as determined at step 304, an indication that no expressions match the input data is provided at step 340, and the process terminates.

When a node 220 corresponding to the retrieved data token exists in model 200, the corresponding node is traversed over an associated link 225 at step 306. The set of expression identifiers 250 (and hence expressions) associated with the traversed link is assigned to a set of candidate expressions for the input data at step 308. Thus, the set of candidate expressions includes expression identifiers 250 indicating the expressions that are candidates to match the input data.

The set of candidate expressions is examined for the presence of any quantification parameters. This may be determined based on the metadata of the traversed link. When quantification parameters exist for an expression in the set of candidate expressions as determined at step 310, the appropriate occurrences of a set of expression tokens in the input data is examined for compliance with the quantification parameters at step 312. This may be accomplished by maintaining a quantity of times a node 220 is traversed during processing of the input data and comparing the quantity of traversals to the quantification parameters (e.g., minimum and/or maximum quantity of occurrences for the set of tokens).

When the quantification parameters are not satisfied as determined at step 312, the corresponding expression (or expression identifier) is removed from the set of candidate expressions at step 314. Once quantification has been examined, the presence of additional data tokens in the input data is determined at step 316. When no additional data tokens exist, the presence of expressions matching the input data is determined at step 334 as described below.

When additional data tokens are present in the input data, the next data token in the input data is retrieved at step 318, and a corresponding node 220 of model 200 associated with an expression token matching or corresponding to the retrieved data token is determined. When no node (or a link to a node) corresponding to the retrieved data token exists, or the candidate set of expressions is empty, as determined at step 320, an indication that no expressions match the input data is provided at step 340, and the process terminates.

When a node 220 corresponding to the retrieved data token exists in model 200, the corresponding node is traversed over an associated link 225 at step 322. The set of candidate expressions is updated based on the set of expression identifiers (and hence expressions) associated with the traversed link at step 324. The set of candidate expressions is formed from the intersection of the set of candidate expressions with the set of expressions associated with the traversed link (e.g., set of candidate expressions=O∩I, where O is the set of expression identifiers (and expressions) associated with the traversed link, and I is the set of candidate expressions).

The set of candidate expressions is examined for the presence of any quantification parameters. This may be determined based on the metadata of the traversed link. When quantification parameters exist for an expression in the set of candidate expressions as determined at step 326 (FIG. 3B), the appropriate occurrences of a set of expression tokens in the input data is examined for compliance with the quantification parameters at step 328. This may be accomplished by maintaining a quantity of times a node 220 is traversed during processing of the input data and comparing the quantity of traversals to the quantification parameters (e.g., minimum and/or maximum quantity of occurrences for the set of tokens).

When the quantification parameters are not satisfied as determined at step 328, the corresponding expression (or expression identifier) is removed from the set of candidate expressions at step 330. Once quantification has been examined, the presence of additional data tokens in the input data is determined at step 332. When additional data tokens are present in the input data, the next data token in the input data is retrieved at step 318 and the above process is repeated until no match exists or all of the data tokens of the input data are processed.

When no additional data tokens exist, the presence of expressions matching the input data is determined at step 334. The resulting set of candidate expressions is determined based on the outgoing links of the current node, and may be represented by:

resulting set of candidate expressions=$I$–$O$, where I is the set of candidate expressions, and O is the set of expression identifiers on all the outgoing links for the current node.

This essentially removes expressions from the candidate set of expressions that require additional tokens and, therefore, do not match the input data. When the resulting candidate set of expressions is empty as determined at step 336, no match is indicated at step 340, and the process terminates. Otherwise, a match is indicated at step 338 and the resulting set of candidate expressions indicate the expressions matching the input data.

With respect to expressions in the set of candidate expressions quantified by wildcard characters (e.g., as indicated by metadata of links 225), the resulting set of candidate expressions is determined based on expressions of the outgoing links of the current node containing wildcard characters, and may be represented by:

resulting set of candidate expressions=$I-(O-Z)$, where I is the set of candidate expressions, O is the set of expression identifiers on the outgoing links for the current node, and $Z=(O \cap I)$ where the results are members of a set of expression identifiers whose last expression token or group of expression tokens is quantified with a wildcard character (e.g., "*", "+", "?", etc.) (as determined from the metadata of links 225).

This essentially removes expressions from the candidate set of expressions that require additional tokens (without a wildcard character) and, therefore, do not match the input data. In other words, expressions that are quantified with a wildcard character for a last set of expression tokens may match the input data, as well as other data with additional repeating tokens and, therefore, are included in the resulting set of candidate expressions.

When the resulting set of candidate expressions is empty as determined at step 336, no match is indicated at step 340, and the process terminates. Otherwise, a match is indicated at step 338 and the resulting set of candidate expressions indicate the expressions matching the input data.

By way of example, model 200 may be configured for expressions "ab(dc)*yz", "ablm", "abym", and "lmz" (e.g., as viewed in FIG. 2), and input data may be received containing data tokens "ablm". The initial data token "a" is retrieved, and the model traverses a corresponding link 225 from start node 205 to a node 220 associated with an expression token "a" corresponding to the data token "a". The link is associated with expression identifiers 1, 2, 3 corresponding to expressions "ab(dc)*yz", "ablm", and "abym", and this set of expression identifiers forms the set of candidate expressions. The next data token, "b", is retrieved. Since a link 225 is present from the current node for expression token "a" to a node 220 for the expression token "b" corresponding to the retrieved data token "b", the model is traversed to the node for expression token "b" from the current node for expression token "a". The set of candidate expressions is updated based on the intersection with the set of expression identifiers for the traversed link (e.g., 1, 2, 3). In this case, the set of candidate expressions remains as containing expression identifiers 1, 2, 3.

The next data token, "1", is retrieved. Since a link 225 is present from the current node for expression token "b" to a node 220 associated with an expression token "1" corresponding to the retrieved data token "1", the model is traversed to the node for expression token "1" from the current node for expression token "b". The set of candidate expressions is updated based on the intersection with the set of expression identifiers for the traversed link (e.g., 2). In this case, the set of candidate expressions contains expression identifier 2 (since the intersection of a set of {1, 2, 3} and a set of {2}=a set of {2}).

The next data token, "m", is retrieved. Since a link 225 is present from the current node for expression token "1" to a node 220 associated with an expression token "m" corresponding to the retrieved data token "m", the model is traversed to the node for expression token "m" from the current node for expression token "1". The set of candidate expressions is updated based on the intersection with the set of expression identifiers for the traversed link (e.g., 2, 4). In this case, the set of candidate expressions contains expression identifier 2 (since the intersection of a set of {2} and a set of {2, 4}=a set of {2}). The resulting set of candidate expressions is determined since the data token "m" is the last data token of the input data. This is accomplished by removing expression identifiers from the set of candidate expressions that are associated with outgoing links from the node for expression token "m". In this case, the resulting set of candidate expressions contains expression identifier 2 (since the expression identifier for outgoing links from the current node is 4 which is not in the set of candidate expressions). Accordingly, the model indicates the expression associated with expression identifier 2 ("ablm") matches the input data of "ablm".

When no link or node exists in the model for a data token of input data, this indicates that the input data does not match any of the expressions. For example, input data may include the set of data tokens "a2". Although a node exists in model 200 for an expression token of "a", no node exists in model 200 with an expression token of "2" corresponding to data token "2". Thus, no link exists between a current node for expression token "a" and a node associated with an expression token "2". Accordingly, no match exists for input data "a2".

The above processing typically applies to anchored expressions. An anchored expression matches entire input data from beginning to end. An unanchored expression may match any portions of the input data. For unanchored expressions, the determination of a match described above (e.g., step 334 of FIG. 3B) is performed at each traversed node in the model. When any matching expressions are identified, these are reported. The process is repeated for each portion of the input data, where each data token of the input data is treated as a first data token of a different portion and the portion includes the remaining tokens in the input. For example, portion of input data of N tokens includes portions with tokens 2 to N, 3 to N, 4 to N, etc. Each portion is treated as a separate input and processed as described above to determine whether the unanchored expression matches that portion. The determination of a match at each traversed node for a portion provides candidate expressions for each sub-portion of the portion being processed, thereby providing matches for the unanchored expressions to any portion of input data.

It will be appreciated that the embodiments described above and illustrated in the drawings represent only a few of the many ways of implementing embodiments for evaluation of plural expressions corresponding to input data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, evaluation module, etc.). These systems may include any types of monitors and input devices (e.g., keyboard, mouse, voice recognition, etc.) to enter and/or view information.

It is to be understood that the software (e.g., evaluation module, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., evaluation module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store any desired information (e.g., expressions, identifiers, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., data for analysis, matching expressions, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., matching expressions, etc.).

The present invention embodiments are not limited to the specific tasks or algorithms described above, but may be utilized for identifying any types of expressions indicating any types of patterns satisfied by any type of data for any purposes. The model may include any quantity of any nodes and links arranged in any fashion, and may be configured for any quantity of any types of expressions. The expressions may be of any syntax, and indicate any desired patterns for input data. The expressions may be applied to any type of data (e.g., string, numeric, floating point, symbols, codes, etc.), and the tokens of the expressions and input data may be of any size and any type of data. The expression identifiers may include any quantity of any type of character, numeric digits, and/or symbols (e.g., alphanumeric characters, numeric digits, symbols, punctuation, etc.) to identify expressions. The set of candidate expressions may be determined and/or updated by combining expressions associated with traversed links in any manner (e.g., intersection, union, addition, subtraction, etc.). The wildcard may be of any quantity, appear at any of zero or more locations within an expression, be represented by any suitable set of one or more characters or symbols, and indicate any desired quantity of occurrences of any quantity of tokens. Further, the links may be associated with any desired information (e.g., expression identifiers, wildcard character presence, quantification parameters, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for evaluating plural expressions comprising: a processor configured to:
    generate a model configured to evaluate a plurality of expressions each including one or more expression tokens and indicating a data pattern, wherein the model includes a plurality of nodes with one or more of the nodes associated with an expression token and one or more links between the nodes, and wherein the links are associated with information indicating each expression including each expression token associated with nodes connected by the links;
    apply data including one or more data tokens to the model;
    traverse the nodes of the model over one or more corresponding links based on the one or more data tokens within the data corresponding to expression tokens associated with the nodes; and
    determine expressions corresponding to the data based on the expressions associated with the one or more corresponding links.

2. The system of claim 1, wherein a response time of the processor is constant for the data with respect to any quantity of expressions, and the plurality of expressions includes a regular expression and is evaluated to provide the determined expressions in a single pass over the data.

3. The system of claim 1, wherein at least two links are traversed based on the one more data tokens, and determining expressions corresponding to the data further comprises:
    determining an intersection of the expressions associated with the at least two links to produce a candidate set of expressions; and
    removing each expression associated with a corresponding outgoing link of a node corresponding to a final data token of the data from the candidate set of expressions.

4. The system of claim 1, wherein at least one expression is associated with quantification parameters specifying a quantity of occurrences for a set of expression tokens, and determining expressions corresponding to the data further comprises:
    verifying compliance of the data with the quantification parameters of the at least one expression; and
    removing each one of the at least one expression for which the data fails to satisfy the associated quantification parameters from the determined expressions.

5. The system of claim 1, wherein at least one expression includes a wildcard character specifying a range of occurrences for a set of expression tokens, and determining expressions corresponding to the data further comprises:
    removing each expression without the wildcard character and associated with a corresponding outgoing link of a node corresponding to a final data token of the data from the determined expressions.

6. The system of claim 1, wherein at least one expression includes an unanchored expression applicable to any portion of the data, and the method further comprises:
    creating a plurality of portions of the data and applying each portion to the model; and
    for each portion, determining expressions corresponding to the portion for each traversed node of the model based on the expressions associated with one or more links creating a path to that node.

7. A computer program product for evaluating plural expressions, the computer program product comprising a computer readable storage medium having program instructions embodied therewith, the program instructions executable by a processor to cause the processor to:
    generate a model configured to evaluate a plurality of expressions each including one or more expression tokens and indicating a data pattern, wherein the model includes a plurality of nodes with one or more of the nodes associated with an expression token and one or more links between the nodes, and wherein the links are associated with information indicating each expression including each expression token associated with nodes connected by the links;
    apply data including one or more data tokens to the model;
    traverse the nodes of the model over one or more corresponding links based on the one or more data tokens within the data corresponding to expression tokens associated with the nodes; and
    determine expressions corresponding to the data based on the expressions associated with the one or more corresponding links.

8. The computer program product of claim 7, wherein a response time of the processor is constant for the data with respect to any quantity of expressions.

9. The computer program product of claim 7, wherein the plurality of expressions includes a regular expression and is evaluated to provide the determined expressions in a single pass over the data.

10. The computer program product of claim 7, wherein at least two links are traversed based on the one more data tokens, and determining expressions corresponding to the data further comprises:
    determining an intersection of the expressions associated with the at least two links to produce a candidate set of expressions; and
    removing each expression associated with a corresponding outgoing link of a node corresponding to a final data token of the data from the candidate set of expressions.

11. The computer program product of claim 7, wherein at least one expression is associated with quantification parameters specifying a quantity of occurrences for a set of expression tokens, and determining expressions corresponding to the data further comprises:
    verifying compliance of the data with the quantification parameters of the at least one expression; and
    removing each one of the at least one expression for which the data fails to satisfy the associated quantification parameters from the determined expressions.

12. The computer program product of claim 7, wherein at least one expression includes a wildcard character specifying a range of occurrences for a set of expression tokens, and determining expressions corresponding to the data further comprises:

removing each expression without the wildcard character and associated with a corresponding outgoing link of a node corresponding to a final data token of the data from the determined expressions.

13. The computer program product of claim 7, wherein at least one expression includes an unanchored expression applicable to any portion of the data, and the method further comprises:

creating a plurality of portions of the data and applying each portion to the model; and     for each portion, determining expressions corresponding to the portion for each traversed node of the model based on the expressions associated with one or more links creating a path to that node.

\* \* \* \* \*